(12) United States Patent
Palky et al.

(10) Patent No.: US 12,331,805 B2
(45) Date of Patent: Jun. 17, 2025

(54) AIR SPRING HAVING COMPOSITE PARTS

(71) Applicant: INFINITY ENGINEERED PRODUCTS, LLC, Fairlawn, OH (US)

(72) Inventors: David A. Palky, Fairlawn, OH (US); Mark G. Trowbridge, Fairlawn, OH (US)

(73) Assignee: Infinity Engineered Products LLC, Fairlawn, OH (US)

( * ) Notice: Subject to any disclaimer, the term of this patent is extended or adjusted under 35 U.S.C. 154(b) by 366 days.

(21) Appl. No.: 17/790,682

(22) PCT Filed: Jan. 8, 2021

(86) PCT No.: PCT/US2021/012596
§ 371 (c)(1),
(2) Date: Jul. 1, 2022

(87) PCT Pub. No.: WO2021/142190
PCT Pub. Date: Jul. 15, 2021

(65) Prior Publication Data
US 2023/0042131 A1   Feb. 9, 2023

Related U.S. Application Data

(60) Provisional application No. 62/959,531, filed on Jan. 10, 2020.

(51) Int. Cl.
*F16F 9/04* (2006.01)
*F16F 9/05* (2006.01)

(52) U.S. Cl.
CPC .............. *F16F 9/0454* (2013.01); *F16F 9/05* (2013.01); *F16F 2222/126* (2013.01);
(Continued)

(58) Field of Classification Search
CPC .... F16F 9/0454; F16F 9/05; F16F 2230/0005; F16F 2226/04; F16F 2222/126;
(Continued)

(56) References Cited

U.S. PATENT DOCUMENTS 4,787,606 A * 11/1988 Geno ...................... F16F 9/057
267/64.27
4,852,861 A * 8/1989 Harris ................... F16F 9/0463
267/122
(Continued)

FOREIGN PATENT DOCUMENTS

EP          3361118 A1      8/2018

OTHER PUBLICATIONS

European Patent No. EP 0295393 to Ecktman published on Dec. 21, 1988.*

(Continued)

*Primary Examiner* — Pamela Rodriguez
(74) *Attorney, Agent, or Firm* — Herrick, Feinstein LLP; Milton Springut

(57) ABSTRACT

An air spring having at least one composite part is provided. The air spring will have a top plate, a flexible sleeve, and a clamp ring coupled together by an injection molded collar. The injection molded collar will be formed to hold the top plate, flexible sleeve, and clamp ring in compression to form an air tight seal. In certain aspects, the top plate and/or the clamp ring may be formed from composites or metals.

20 Claims, 5 Drawing Sheets

(52) U.S. Cl.
CPC ... *F16F 2226/04* (2013.01); *F16F 2230/0005* (2013.01); *F16F 2230/02* (2013.01)

(58) Field of Classification Search
CPC .......... F16F 2230/02; F16F 2224/0241; B29C 45/14; B60G 11/27; B60G 2202/152; B60G 2206/424; B60G 2206/81012
See application file for complete search history.

(56) References Cited

U.S. PATENT DOCUMENTS

| | | | |
|---|---|---|---|
| 10,197,126 B2* | 2/2019 | Jackson, Jr. ............ | B60G 11/28 |
| 2003/0160368 A1* | 8/2003 | Bank ....................... | F16F 9/05 |
| | | | 267/64.27 |
| 2004/0026837 A1* | 2/2004 | Ferrer ...................... | F16F 9/38 |
| | | | 267/64.11 |
| 2006/0273501 A1* | 12/2006 | Taylor ...................... | F16F 9/05 |
| | | | 267/64.27 |
| 2014/0252702 A1 | 9/2014 | Trowbridge et al. | |
| 2017/0023085 A1 | 1/2017 | Trowbridge et al. | |

OTHER PUBLICATIONS

International Search Report from parent PCT application PCT/US2021/012596, 2 pages.

* cited by examiner

AIR SPRING HAVING COMPOSITE PARTS

CROSS-REFERENCE TO RELATED PATENT APPLICATIONS

This application is a § 371 filing of PCT application PCT/US2021/012596 filed on Jan. 8, 2021, which claims priority benefit of U.S. Provisional patent application Ser. No. 62/959,531 filed Jan. 10, 2020, and entitled "Air Spring Having Composite Parts." The disclosures of the aforementioned PCT application and U.S. Provisional patent application Ser. No. 62/959,531 are hereby incorporated by reference in their entirety.

BACKGROUND

The technology of the present application relates to air springs. An air spring may be used in a wide variety of vehicles and other machines. Typically, an air spring provides a cushioning between parts that move with respect to each other to reduce wear that may be caused by shock loads.

An air spring may comprise a flexible member, such as an elastomeric sleeve that extends between a pair of plates, typically referred to as a top or bead plate and a bottom plate or piston. The elastomeric sleeve is attached to each of the top plate and the bottom plate to form an air tight seal. With the air tight seal, the elastomeric sleeve, top plate, and bottom plate form a pressurized chamber. The pressurized chamber contains a fluid, typically a gas such as air. The fluid contained in the pressurized chamber acts as a spring.

The top plate, and the bottom plate, are typically formed from a metal, such as, for example, iron or steel. The iron or steel plates, however, are exposed to the environment and suffer from corrosion, such as simple rusting or oxidation. To reduce the effect of corrosion, the metal may be treated or coated, which for example zinc, so the steel is not exposed to the environment. However, the process of attaching the plates to the sleeve often compromises the treatment or coating, which leads to reduced effectiveness of the coating and, eventually, corrosion.

One attempt to overcome the deficiencies of the prior art may be found in U.S. Pat. No. 9,388,876, titled Composite bead plate and an air spring using the same, which issued on Jul. 12, 2016, and is owned by the present application, which disclosure is incorporated herein by reference as if set out in full. U.S. Pat. No. 9,388,876 provided, among other things, preforming certain plastic parts that are assembled during the final assembly of the air spring. Another attempt to overcome the deficiencies in the prior art include German Patent Application No. DE201710202094, owned by Contitech Luftfedersysteme GmbH, the disclosure of which is incorporated herein as if set out in full. The German Patent Application, similar to the U.S. Pat. No. 9,388,876, includes forming the top plate from multiple preformed plastic parts that are subsequently joined.

While each of the above solutions are functional in their own way, neither provides a sufficiently robust solution for all applications of air springs. However, it is desirable to increase the amount of composite parts (or plastic parts) in an air spring for durability, weight, and cost reasons to name but a few reasons. Composite and plastic are used interchangeably herein.

Thus, against this background, it would be desirable to provide an air spring where at least portions of the air spring comprise composite parts instead of metal.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, an air spring having at least one composite part is provided. The air spring will have a top plate, a flexible sleeve, and a clamp ring coupled together by an injection molded collar. The injection molded collar will be formed to hold the top plate, flexible sleeve, and clamp ring in compression to form an air tight seal. In certain embodiments, the top plate also is formed as a composite. In other embodiments, the clamp ring also is formed as a composite. In yet other embodiments, the top plate, clamp ring, and injection molded collar are all formed from composites.

In some embodiments, at least one of the clamp ring and top plate are formed with at least one of a plurality of indentations, perforations, channels, or a combination thereof. The indentations, perforations, channels, or combinations are filled with the injected plastic to facilitate the connection between the collar and the top plate and clamp ring.

In some aspect, a method of forming an air spring having at least one composite part is provided. The top plate, clamp ring, and flexible sleeve for an air spring are placed into a mold of an injection mold press. The press applies a compressive force to the top plate, clamp ring, and flexible sleeve forming an air tight seal between the top plate, clamp ring, and flexible sleeve. Plastic is injected into the mold while the press is applying the compressive force, which compressive force is held until the injected plastic cures and forms the injected mold collar. Once the injected mold collar is formed, the press is opened, and the air spring is removed. Optionally, the parts can be subsequently machine finished.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to an air spring for a heavy-duty vehicle. However, the technology described herein may be used with applications other than those specifically described herein. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
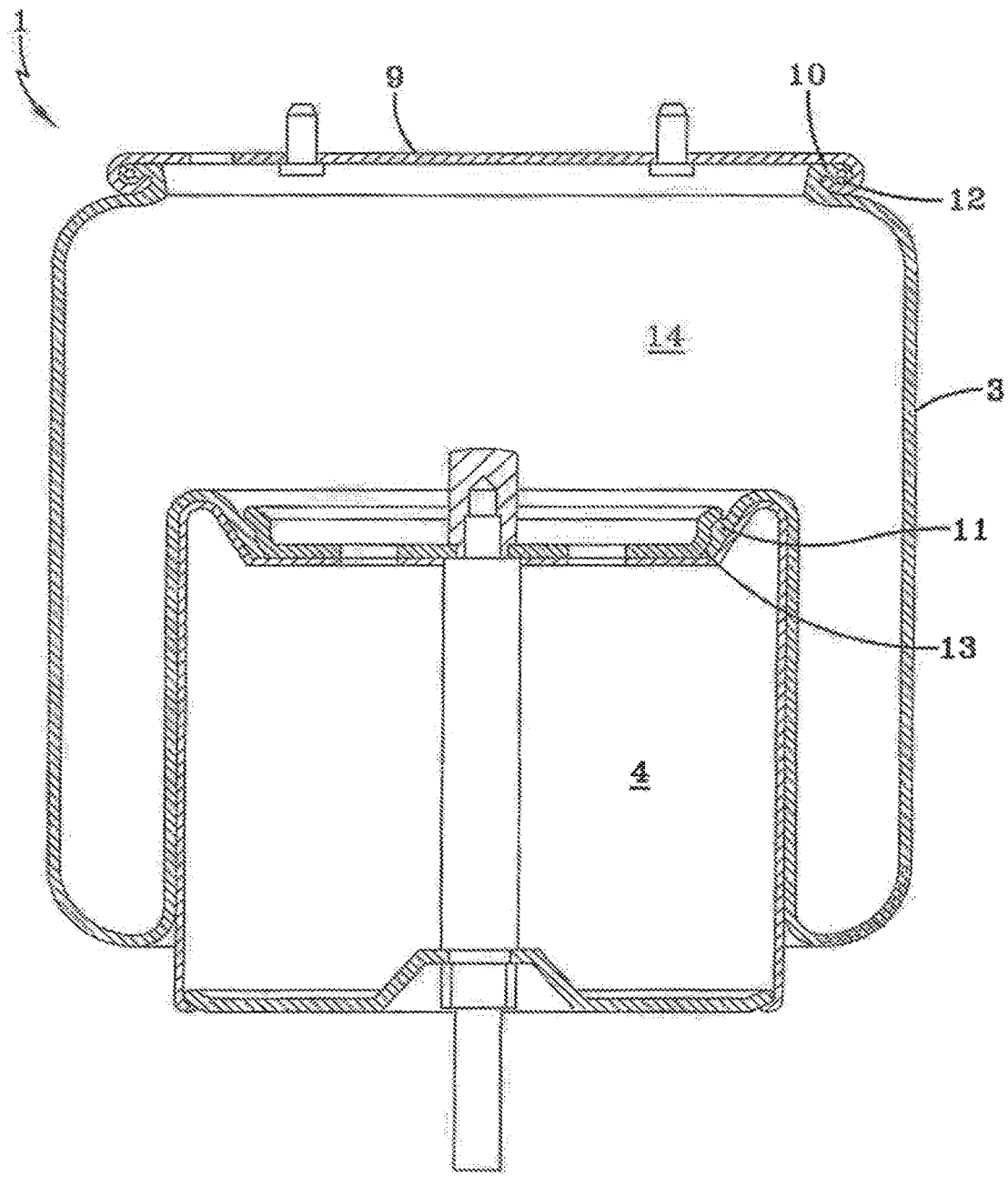
FIG. 1 is a cross-sectional view of a prior art air spring.

FIG. 1 shows a cross-section of a conventional state of the art air spring 1. The conventional state of the art air spring 1 includes a steel bead plate 9, a flexible member 3, and a piston 4. The flexible member includes an upper portion of the flexible member 10 which extends from the upper end of the flexible member 12 to no more than 25% along the length of the flexible member 3 from the upper end of the flexible member 12 to the lower end of the flexible member 13. The upper portion of the flexible member 10 is adapted to be affixed to the steel bead plate 9 to create an air tight seal. The flexible member 3 also includes a lower portion of the flexible member 11 which extends from the lower end of the flexible member 13 to no more than 25% along the length of the flexible member 3 from the lower end of the flexible member 13 to the upper end of the flexible member 12. The lower portion of the flexible member 11 is adapted to be affixed to the piston 4 to create an air tight seal. The lower portion of the flexible member 11 may be secured in any conventional manner, including, but not limited to, crimping the lower portion of the flexible member 11 to the piston 4 or to a conventional lower retainer or by securing a lower bead core by a lower retainer. An internal bumper may be provided for absorbing impact forces.

The steel bead plate 9, the flexible member 3, and the piston 4 define a pressurizable chamber 14. The pressurizable chamber 14 is generally filled with a gas, such as air or nitrogen, to a pressure greater than atmospheric pressure. The gas is usually air for economic reasons. However, the pressurizable chamber can optionally be filled with an inert gas, such as nitrogen to help protect the flexible member (a rubber component) from degradation caused by oxygen or ozone. The steel bead plate 9 is attached to either a fixed or movable component and the piston 4 is attached to a corresponding fixed or movable component so that loads tending to move the steel bead plate 9 and the piston 4 towards each other will be counteracted by the pressure within the pressurizable chamber 14.

As can be appreciated, the steel bead plate 9 is rolled or crimped at the outer radial edge such that the upper portion 12 of the flexible member 3, i.e., the upper portion 12 that encompasses the retention bead (shown but not specifically referenced in FIG. 1). As mentioned above, the steel bead plate 9 is subject to corrosion. Moreover, the crimping (or rolling) of the steel bead plate 9 at the outer radial edge can cause cracks, sometime micro-cracks, that are further any potential corrosion or oxidation of the steel bead plate 9.

Figure 2:
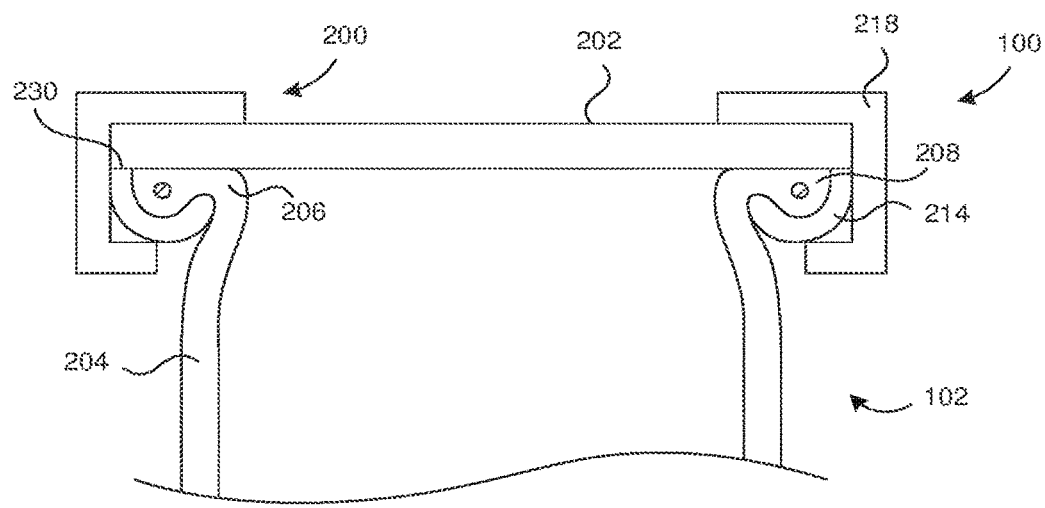
FIG. 2 is a cross-sectional view of a top portion of an air spring constructed in accordance with the technology of the present application.

FIG. 2 shows a cross-sectional view of a top 102 of an air spring 100 consistent with the technology of the present application. The bottom of the air spring 100 may be consistent with known technology for air spring's and is not shown herein expect as necessary for an understanding of the technology. The air spring 100 includes a top plate 202, a flexible sleeve 204, a clamp ring 214, and a collar 218. The top plate 202, the flexible sleeve 204, the clamp ring 214, and the collar 218 joint to form joint 200, which facilitates forming an air tight seal between the top plate 202 and the flexible sleeve 204 that allows the air spring to be pressurized, as shown in FIG. 2. The joint 200 will be explained further below with reference to FIG. 3.

Figure 3:
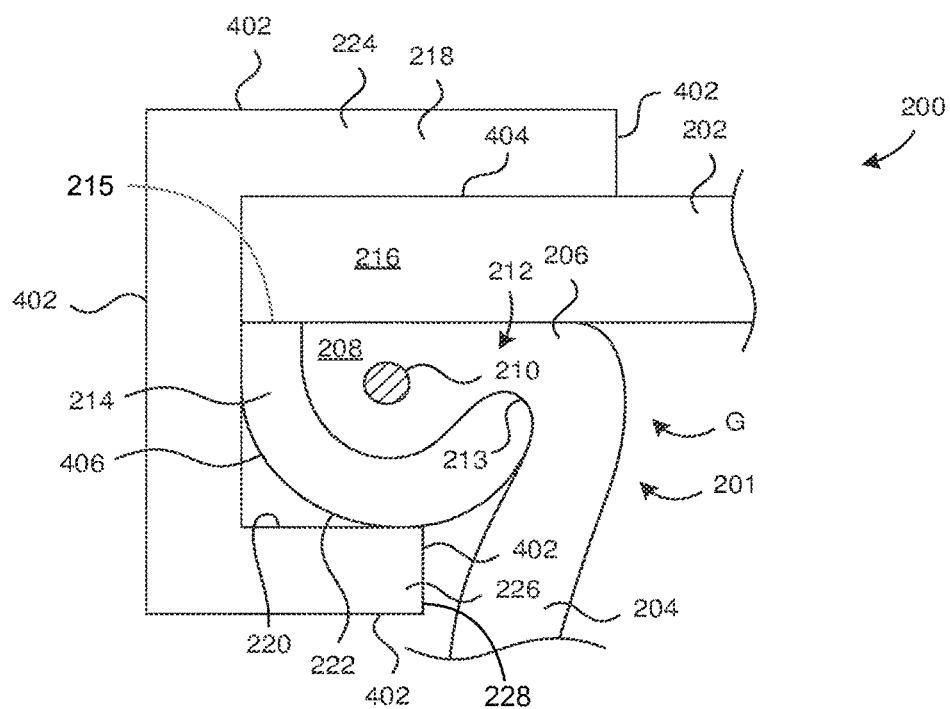
FIG. 3 is a cross-sectional view of the joint of FIG. 2.

FIG. 3 shows a cross-sectional view of the joint 200 consistent with the technology of the present application. The joint 200 forms, among other things, an air tight seal 201 between the top plate 202 and the flexible sleeve 204. The terminal end 206 of the flexible sleeve 204 comprises a retention bead 208 that contains a wire member 210 to facilitate structural integrity. In certain embodiments, the wire member 210 may be optional in view of the improvements presented by the technology of the present application.

The terminal end 206 of the flexible sleeve 204, or the retention bead 208, is captured in a cavity 212 formed by top plate 202 and a clamp ring 214. As shown in this example, the top plate 202 does not need to be bent, but can remain a relatively flat, planar shape at the outer radial end portion 216. The clamp ring 214 is shown as having a crescent shape but could form other shapes. The cavity 212 is generally circular, oval, elliptical, or the like to facilitate capture of the retention bead, but the cavity 212 could be alterative geometric or random shapes that accommodate the retention bead 208. The annular clamp ring 214 has a seal end surface 213 that forms a gap G between a surface of the top plate 202 and the seal end surface 213. The flexible sleeve 204 extends from the retention bead through the gap G. The seal end surface 213 engages with the flexible sleeve 204 and the surface of the top plate 202 engages with the flexible sleeve 204 to form an air tight seal.

The clamp ring 214 has a second end surface 215 opposite the seal end surface 213 that that abuts the surface of the top plate 202. The clamp ring 214 is pressed against the top plate 202 and held in place by a collar 218 as will be explained further below. The collar 218 is shown with a C shape, but the shape is not limited to a C shape and, as will be clear from the below, an internal surface 220 of the collar 218 will likely be operatively shaped to coincide with an outer surface 222 of the clamp ring 214. The collar 218 has a top plate engagement portion 224 that generally aligns with the top plate 202 and a clamp ring engagement portion 226 that generally engages the clamp ring 214. The end 228 of the clamp ring engagement portion 226 is shown as squared off or with edges, but the end portion 228 may be rounded, blunt, or chamfered. The end portion 228 may, in certain embodiments, engage the flexible member 204 at times as the flexible member is pressurized and depressurized. The end portion 228 being rounded, blunt, or chamfered may reduce wear on the flexible member 204.

Figure 4:
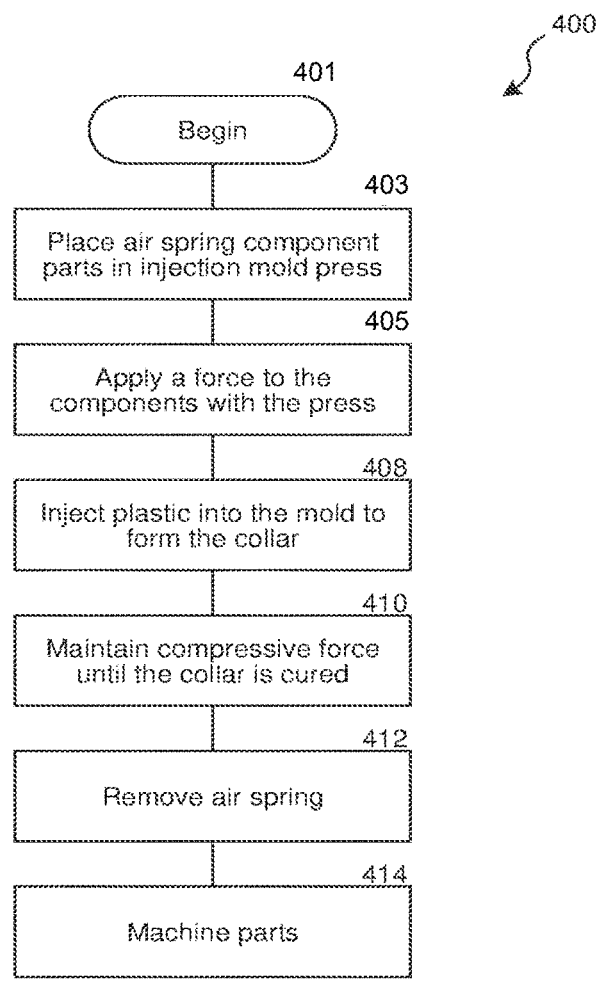
FIG. 4 is a flow chart illustrative of a process for forming the air spring having composite parts consistent with the technology of the present application.

The collar 218, as will be explained with reference to FIG. 4, is formed after the top plate 202, flexible sleeve 204, and clamp ring 214 are put together. The top plate 202, flexible sleeve 204, and clamp ring 214 are held in place and a press, such as an injection molding press, is applied to force the top plate 202 and clamp ring 214 together in compression such that the flexible sleeve 204 is compressed in the cavity 212. The flexible sleeve 204 is compressed in the gap G to form an air tight seal. The press compresses the parts, as explained, in a mold configured for injection molding. The mold forms the collar shape around the parts and a plastic is injected into the mold and held in place at pressure until the plastic cures such that the collar 218 is injection molded around the top plate 202 and clamp ring 214.

FIG. 4 shows an exemplary method 400 of forming the air spring having composite parts consistent with the technology of the present application. The exemplary method 400 is illustrative and shown in several discrete steps. Each of the steps, in context, may be performed in alternative orders and/or simultaneously with other steps. Additionally, certain of the steps may be combined into a single step or any of the single steps may involve multiple additional or sub steps as required. With that, the process begins at step 401. The component parts of the air spring, including the top plate 202, the flexible sleeve 204, and the clamp ring 214, are arranged in a mold in an injection mold press, step 403. A force is applied to the component parts of the air spring by the injection mold press, step 405.

While the press is compressing the top plate 202, the flexible sleeve 204, and the clamp ring 214 together, a plastic composite is injected into the mold, step 408. The compression is maintained by the press until the plastic composite is solidified, step 410. Once solidified, the press released and the air spring with the composite parts consistent with the technology of the present application is removed from the injection mold press, step 412, with the collar formed by the injection molding process. Optionally, the collar may be machined to a shape, step 414.

As can be appreciated, the injection mold press would form a mold with an outer shape as designed, which would typically be an annular shape, but the shape would match the shape of the air spring. The outer surface of the mold is shaped consistent with the outer surface 402 of the collar 218 as shown in FIG. 3. As explained above, the inner surface of the mold will be formed, in most cases, by the surface 404 of the top plate 202 and an outward surface 406 of the clamp ring 214. However, in certain embodiments, the inner surface of the mold may be formed in the shape consistent with the inner surface 220 of collar 218, shown in FIG. 3.

Figure 5:
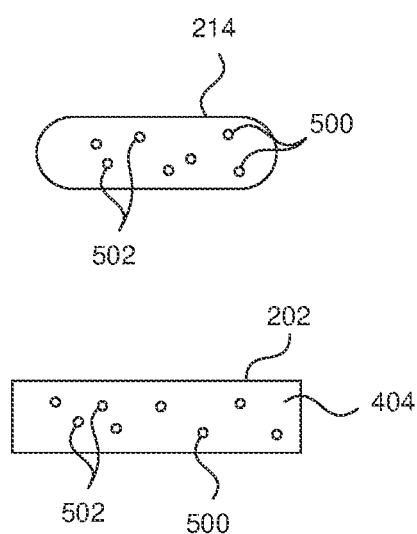
FIG. 5 is an elevation view of a bottom surface of the clamp ring and a top surface of the top plate of FIG. 2.

FIG. 5 shows a bottom elevation view of the clamp ring 214. The clamp ring 214 is shown with indentations 500 or perforations 502. The indentations 500 and perforations 502 are formed at least in the outward surface 406 of the clamp ring 214 to allow the injected composite flow and cure in the indentations 500, perforations 502, or a combination thereof. Although shown and described in this embodiment, the indentations 500, perforations 502, or combination thereof may be located on the assembly in a plurality of locations. The perforations 502 may be formed as through bores. Still with reference to FIG. 5, a top elevation view of the top plate 202 is shown. The surface 404 of the top plate 202 may have indentations 500, perforations 502, or a combination thereof as well. The indentations 500, perforations 502, or the combination may increase the strength of the connection between the collar 218 and the top plate 202/clamp ring 214.

Figure 6:
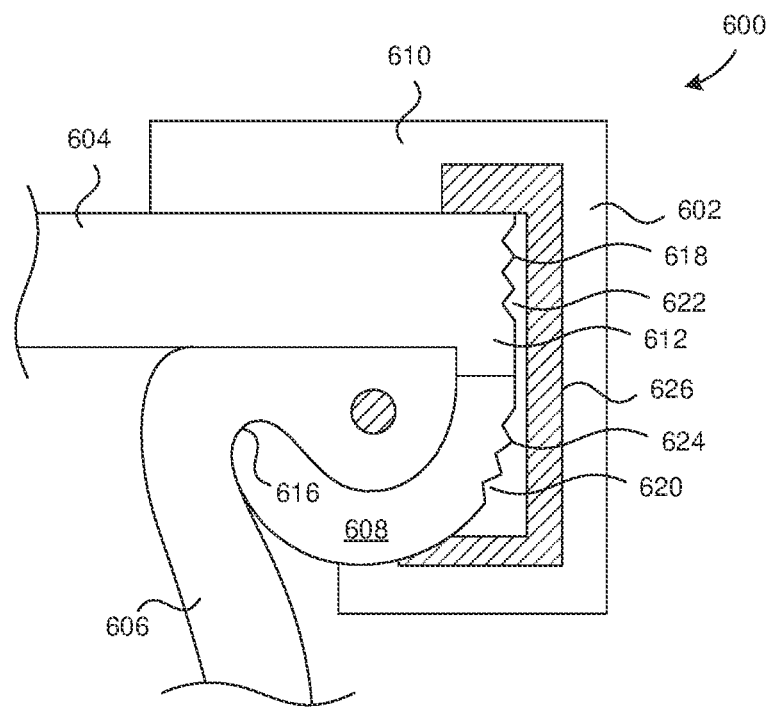
FIG. 6 is a cross-sectional view of a top portion of an air spring constructed in accordance with the technology of the present application.

FIG. 6 shows a similar air spring 600 with an injection molded collar 602. The air spring 600 includes a top plate 604, a flexible sleeve 606, and a clamp ring 608 in addition to the collar 602. The top plate 604, unlike the top plate 202 described above, is bent at a radially outer edge 610 to provide a downwardly extending circumferential lip 612. The clamp ring 608 is similar to the clamp ring 214 described above and is shaped to form the gap G between the top plate 604 and the sealing surface 616 of the clamp ring. The outer surface 618 of the circumferential lip 612 and the outer surface 620 of the clamp ring 604 may be scarred or grooved with channels 622, which correspondingly form ridges 624. The channels 622 and ridges 624 are filled during the injection molding process to facilitate the grip between the molded collar 602 and the top plate 604 and clamp ring 608.

Additionally, as shown in FIG. 6, a reinforcing rib 626 may be provided in the collar 602 (or the molded collar 218 above). The reinforcing rib 626 may be a metal or composite of additional strength to facilitate the structural integrity of the collar 602 as it is exposed to vibration, shock forces, corrosive environments, a combination thereof, or the like. The reinforcing rib 626 may be operatively shaped similar to the collar (as shown) or have alternative shapes including straight shapes.

With reference back to FIG. 2, the top plate 202 and the clamp ring 214 form a junction 230. When compressed, the junction 230 inhibits the injected plastic from contacting the retention bead 208 and flexible sleeve 204.

Figure 7:
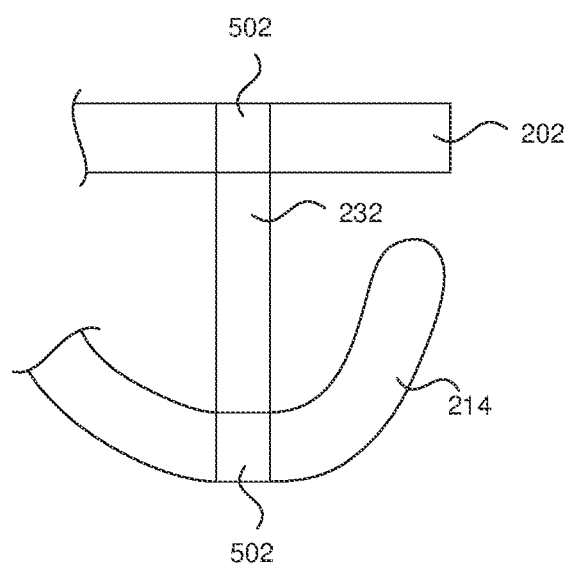
FIG. 7 is a cross-sectional view of a top plate and clamp ring with a connecting column sleeve.

As described above, and shown in isolation in FIG. 7, the top plate 202 and clamp ring 214 may have perforations 502 that form through holes. The through holes 502 provide a pathway for the plastic of the injection molded collar to contact the flexible sleeve 204. Thus, the injected plastic flowing into the perforations may increase the strength of the connection, but may, in certain aspects, weaken or otherwise damage the flexible sleeve 204. In certain aspect, column sleeves 232 may be provided providing a channel between the top plate 202 and the clamp ring 214 such that a barrier is provided between injection mold and the flexible sleeve. The injected plastic would thus flow from the collar lower part to the collar upper part through the clamp ring 214 and the top plate 202 forming a connector.

As can be appreciated, the injection molded collar 218, 602 provides a strong connection between the top plate 202, 604 and the clamp ring 214, 608. The collar 218, 602 functions whether the top plate 202, 604 is a metal or a composite. Similarly, the clamp ring 214, 608 may be a metal or composite.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An air spring comprising,
   a top plate having a top surface and a bottom surface opposite the top surface;
   a flexible sleeve having a retention bead at a terminal end portion of the flexible sleeve;
   a clamp ring, the clamp ring forming a cavity with the bottom surface of the top plate, wherein the retention bead is in the cavity and the flexible sleeve extends from the retention bead through a gap formed between a seal end surface of the clamp ring and the bottom surface of the top plate; and
   an injection molded collar formed from an injection molded plastic, the injection molded collar operatively shaped to hold the clamp ring to the top plate such that the retention bead and the flexible sleeve are compressed forming an air tight seal between the top plate and the retention bead and flexible sleeve.

2. The air spring of claim 1 further comprising a piston coupled to the flexible sleeve.

3. The air spring of claim 1 wherein the top plate is formed from a composite.

4. The air spring of claim 1 wherein the top plate is formed from a metal.

5. The air spring of claim 1 wherein the clamp ring is formed from a composite.

6. The air spring of claim 1 wherein the clamp ring is formed from a metal.

7. The air spring of claim 1 wherein the top plate comprises at least one indentation or perforation.

8. The air spring of claim 1 wherein the clamp ring comprises at least one indentation or perforation.

9. The air spring of claim 8 wherein the top plate comprises a corresponding at least one indentation or perforation.

10. The air spring of claim 1 wherein the top plate has a circumferential lip at a radial edge.

11. The air spring of claim 1 wherein at least one of the top plate or the clamp ring have channels and ridges formed on an outer surface.

12. The air spring of claim 1 wherein the injected molded collar includes at least one reinforcing member.

13. The air spring of claim 1 wherein the injection molded collar comprises a top plate engagement portion adapted to engage the top plate and a clamp plate engagement portion adapted to engage the clamp plate.

14. The air spring of claim 1 wherein the injection molded collar comprises a C shape in cross section.

15. A method of forming an air spring having an air tight seal between a top plate and a flexible sleeve with a retention bead, the method comprising:
   arranging the top plate, the flexible sleeve with the retention bead, and a clamp ring in an injection mold press;
   causing the injection mold press to compress the top plate and the clamp ring such that the flexible sleeve with the retention bead is compressed forming an air tight seal;
   while maintaining the compression, injecting a plastic into the injection mold press;
   holding the compression while the injected plastic forms to form an injection molded collar coupling the clamp ring and the top plate such that the top plate, the flexible sleeve with the retention bead, and the clamp ring form the air tight seal;
   releasing the compression by opening the injection mold press; and
   removing the air spring formed with at least one composite part.

16. The method of claim 15 wherein the process further comprises machine finishing the injection molded collar.

17. The method of claim 15 further comprising placing at least one reinforcing member in the injection mold press such that the at least one reinforcing member is contained in the injection molded collar.

18. The method of claim 15 wherein at least one of the top plate and the clamp ring are formed from a composite.

19. The method of claim 15 wherein both the top plate and the clamp ring are formed from a composite.

20. The method of claim 15 wherein holding the compression while the injected plastic forms comprises holding the compression while the injected plastic solidifies.

* * * * *